WALTER DEHETRE & WILFRED DEHETRE.
MILK CONDENSER.
APPLICATION FILED JUNE 4, 1907.
956,571.
Patented May 3, 1910.
2 SHEETS—SHEET 2.
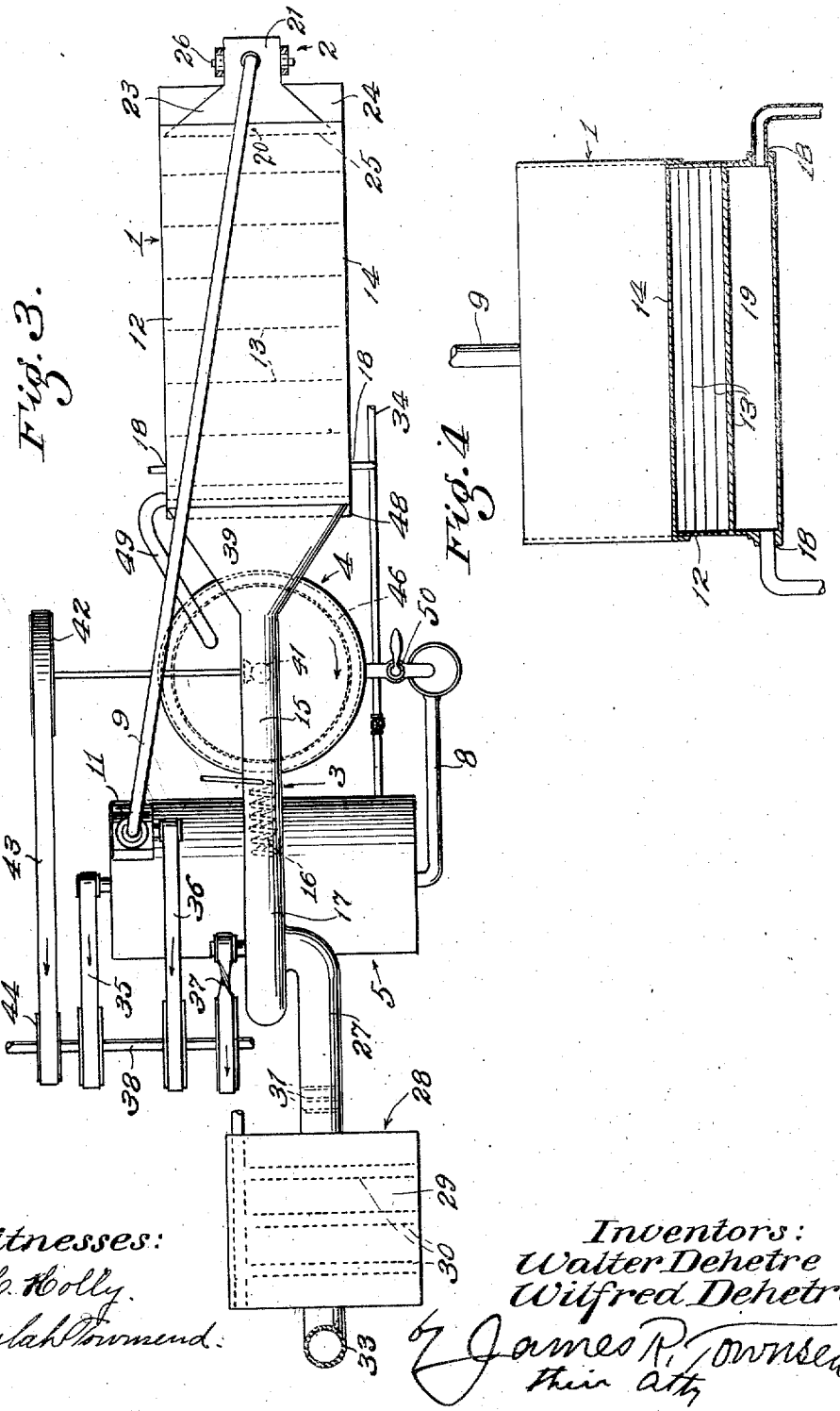
Witnesses:
C. C. Holly.
M. Beulah Townend.
Inventors:
Walter Dehetre
Wilfred Dehetre.
James R. Townsend
their Atty

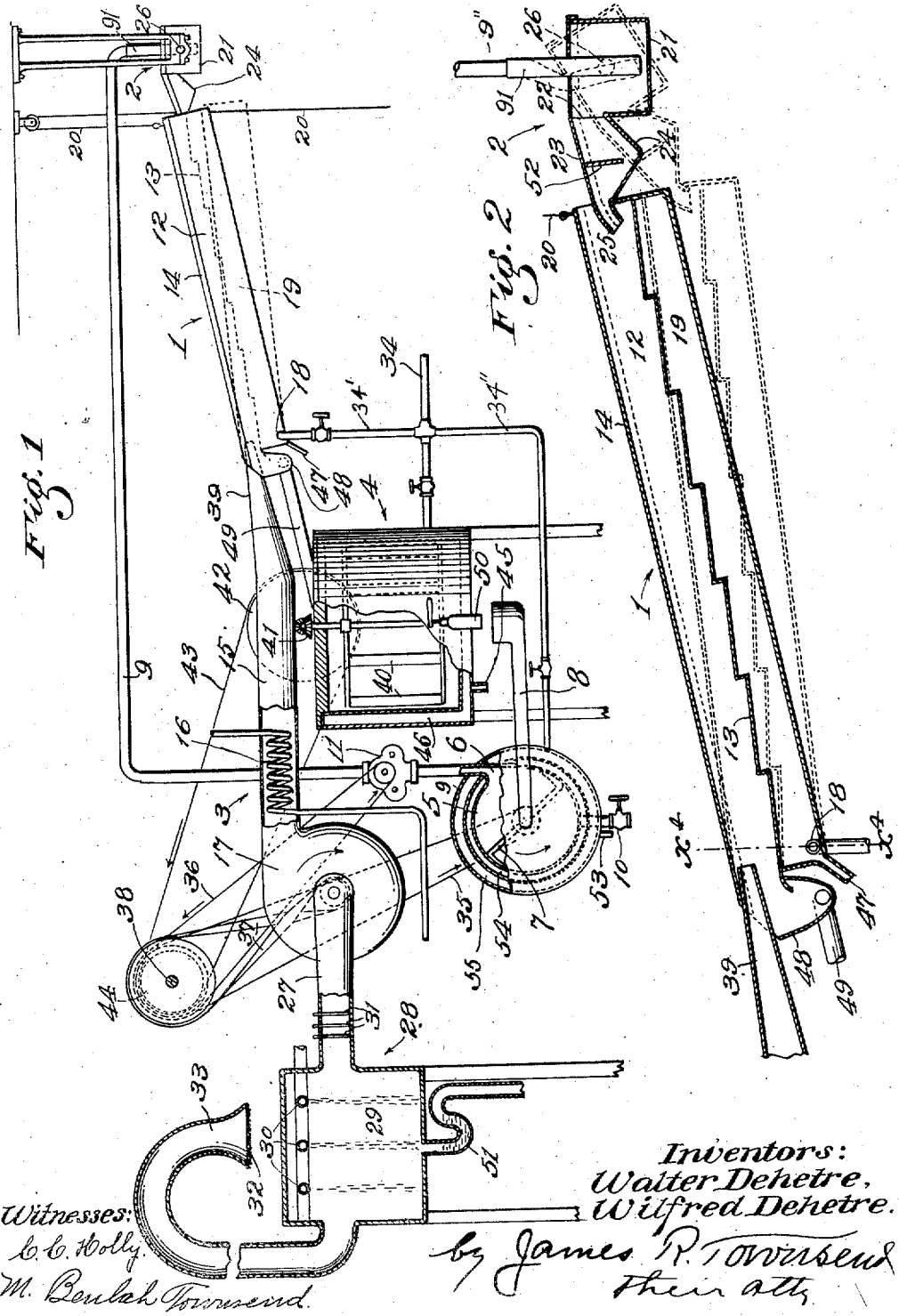

UNITED STATES PATENT OFFICE.

WALTER DEHETRE AND WILFRED DEHETRE, OF COMPTON, CALIFORNIA.

MILK-CONDENSER.

956,571.   Specification of Letters Patent.   Patented May 3, 1910.

Application filed June 4, 1907. Serial No. 377,255.

*To all whom it may concern:*

Be it known that we, WALTER DEHETRE and WILFRED DEHETRE, both citizens of the United States, residing at Compton, in the county of Los Angeles and State of California, have invented a new and useful Milk-Condenser, of which the following is a specification.

The objects of this invention are to provide novel, improved means whereby milk may be rapidly and safely condensed without material loss of the food-elements thereof and without danger or injury thereto from overheating, and to conduct the operation in the most rapid and satisfactory manner without any danger of contaminating the milk.

The apparatus may be variously constructed, and in the accompanying drawings we will show the form at present deemed most desirable.

The accompanying drawings illustrate the invention.

Figure 1 is a side elevation of apparatus embodying this invention, parts being in section for clearness of illustration. Fig. 2 is an enlarged sectional detail of the aerator. Fig. 3 is a plan of the apparatus. Fig. 4 is a section on line $x^4$—$x^4$, Fig. 2.

The milk condenser comprises the combination of several apparatuses and appliances which successively operate upon the milk, and by reason of their peculiar construction the combined result upon the milk treated is peculiarly effective to secure the objects hereinbefore enumerated.

Referring now particularly to the drawings, 1 designates a steam-jacketed aerator which is arranged to cause the milk to present a large surface to the air and to cause the air to rapidly take up moisture from the milk.

2 is a distributer to supply milk to the aerator in a thin, even sheet across the entire width of the aerator.

3 designates means for supplying heated air to the aerator to carry away the moisture from the milk.

4 designates a steam-jacketed tank arranged to receive milk from the aerator. Said tank in fact forms a reservoir into which the milk may best be placed before starting the condenser into operation, and from which the milk may be drawn to sup- ply the aerator, as will hereinafter more fully appear.

5 is a hollow steam-jacketed cylinder for the purpose of heating milk drawn from the tank prior to its delivery to the distributer from which it passes to the aerator. Said cylinder is of considerable length, as is clearly shown in Fig. 3, preferably being of greater length than the diameter of the tank or vat 4 into which the milk is delivered from the dairy or dairies from which the milk to be operated upon is supplied. Said cylinder is provided at one end with a peripheral outlet 6. Inside said cylinder is a rotary blade 7, and milk is delivered to the cylinder through a supply-pipe 8 at the end of the cylinder opposite that from which the outlet-pipe 6 leads. Said supply-pipe opens into said cylinder at the axis thereof so that the milk delivered from the pipe 8 to the cylinder while the blades 7 are rotating, will be carried outwardly to the wall of the cylinder, and will, as the operation continues, flow spirally around the wall to the other end where it reaches the outlet 6. Said pipe 8 is arranged to conduct milk from the tank or vat 4 to the cylinder.

9 is a pipe to conduct milk from the outlet of the cylinder.

10 is a valved drain to drain any milk that may remain in the cylinder after the operation hereinafter described has ceased.

11 designates a rotary pump to draw milk from the cylinder through pipe 9 and force it through pipe 9″ to the distributer.

40 designates circulating means in the form of rotary arms in the tank or vat 4, and 50 a cock or valved draw-off spout to deliver milk from the tank 4 to the pipe 8.

The aerator 1 preferably comprises an inclined steam-jacketed trough 12 open at the ends and provided with a stepped bottom 13 and covered by a cover 14 for the purpose of directing along, above the stepped bottom 13, a current of hot air supplied from an air-pipe 15 provided with an internal heating coil 16 and leading directly from a blower 17; said blower, pipe and heating coil constituting the means 3 for supplying hot air to the aerator 1.

The aerator is preferably adjustably mounted, being supported at one end by a journal 18 which is preferably hollow and communicates with the steam-jacket 19 of the aerator trough 12. This journal 18 is preferably placed at the lower end of the aerator while the upper end is supported by a cable 20 which is adapted to raise and lower the upper end throughout a considerable arc in order to increase or diminish the speed with which the milk will flow down the steps of the aerator.

The distributer 2 preferably comprises a box 21 which has a side outlet 22 considerably above the bottom of the box, and which discharges through a spout 23 having a trough 24 which extends downward below the level of outlet 22 of the box and has an outlet in the form of a wide spout or apron 25 that overhangs the topmost of the aerator steps. Said box 21 is preferably pivoted on a horizontal axis at 26, and is adapted to tilt to accommodate the spout or apron 25 to the top end of the aerator, as the same is raised and lowered.

The pipe 9 has a flexible hose 91 which extends down into the box below the level of the box outlet 22 so that the milk that enters the box will flow upward from the mouth of pipe 9, and will thus be distributed in the box before it flows out through the opening 22. As it flows out through said opening 22 it spreads out to a level across the apparatus, and as it passes through the spout 25 it is distributed and spread out into a comparatively thin sheet extending across the aerator-trough, from side to side thereof. The transverse traces of the surface of said trough are horizontal so that the milk will flow down over the steps in an evenly-distributed stream extending from side to side of the trough.

It is essential that the air supplied to the trough shall be free from extraneous material, as dust, particles of matter, insects, and the like, which may be in the surrounding air. The supply-pipe 27 of the blower is therefore provided with an air-purifying device 28 comprising a water-chamber 29 provided with dripping-pipes 30 to cool and purify the air, and having between the water-chamber and the blower a series of screens 31 of cheese-cloth or other suitable material to screen the air.

32, 33, designate a screened inlet to supply air to the dripping water chamber.

34 indicates a pipe to lead steam from a boiler, not shown, which may be employed to supply steam to the various steam jackets and heating devices, and may also supply power for driving the centrifugal cylinder and the blower. A valved branch 34' of the pipe 34 supplies steam to the chamber 19 through the hollow journal 18, and a valved branch 34" conducts the steam to the steam-jacket 55.

The rotary blades 7, the rotary pump 11, and the rotary blower 17 may all be connected together by belts 35, 36, 37 and driven from the same source of power, as line shaft 38, and may be timed to operate conjointly to produce the requisite flow of milk and air through the apparatus. The air-chute formed by the stepped trough 12 and its cover 14, is open to the external air at the upper end of the chute and is closed to the external air at its lower end except through the air-supply-pipe 15, so that all the air which passes through the aerator is first purified and then heated. This heated air is distributed to the lower end of the chute by a flat-mouthed nozzle 39. The rotary blades 40 in the tank 4 are driven through bevel gear 41, pulley 42, belt 43, pulley 44, and line shaft 38 to stir the milk in the tank 4.

45 designates a valved drain pipe for the water of condensation from steam jacket 46 of the milk tank 4.

47 is a drainage outlet for water of condensation from the steam jacket 19 of the aerator.

48 is a collecting trough at the bottom of the aerator trough 12 to collect the milk from the aerator and deliver it through pipe 49 to the tank 4.

51 is a trap to allow water to flow from the tank 29.

52 is a partition in the distributing trough 24 to prevent air from passing from the aerator through the distributer when the trough is filled with milk.

53 is a drain from the steam jacket 55 of the cylinder 5. 54 is a hollow wall of said cylinder to prevent the steam in the jacket 55 from overheating the milk in said cylinder.

In practical operation the tank 4 will be supplied with milk from the dairy or dairies, and may be filled to any desired extent, and the milk may be supplied thereto during the operation of the apparatus as hereinafter described. The line shaft 38 being started into operation, the blade 7 and the operating parts of the pump 11 and of the blower 17 will be set into operation in the direction indicated by the arrows of direction in Figs. 1 and 3, thus producing a blast of air upward through the aerator and also producing suction to the pump 11 from the cylinder 5. Attendant will open the cock 50, thus allowing milk to flow from the pump or vat 4 into the pipe 8, and thence into one end of the cylinder at the axis thereof. The milk thus flowing into the cylinder will be caught by the rotary blades 7 and will be whirled around the inside walls of said cylinder, and will be heated by contact with said walls, which walls are heated by said jacket 5. In the meantime the milk in the vat 4 will also be subjected to the heat of the steam-jacket 46. Such heating in this vat may have been begun at a considerable time previous to opening the cock 50 so that when the cock 50 is opened, hot milk will be supplied to the pipe 8.

As the milk continues to flow into the cylinder 5 and is whirled around inside thereof by the blades 7 it is impelled outward by centrifugal action and is evenly distributed against the walls of said cylinder, where it finally forms such depth of milk around said walls and over the mouth of the outlet-pipe 9 at the farther end of the cylinder, that it would be thrown through said outlet; and the suction of pump 11 is operative to draw milk through said pipe 9 and deliver it to and drive it onward through the conveying pipes 9'' and 91 into the distributer 21, which when sufficiently filled, overflows through the laterally-elongated spout 25, whence it flows in an even stream onto the stepped surface of the aerator down which it flows to the collecting trough 48, and thence through pipe 49 to the tank or vat 4, where it is again subjected to heat, together with the milk already in the vat. As the milk passes down through the aerator it is subjected to the hot air which passes through the aerator trough. It is thus seen that the pipe affords means to deliver milk from the tank to the cylinder 5, which, together with the rotary blades constitutes a kind of circulating pump where the milk is first heated and is then impelled onward; and that the pipe 9, rotary pump 11, and pipe 9'' serve as means to convey the milk from such circulating and heating pump to the distributing box whence it flows through the transverse trough to the aerating trough down which it flows to finally return to the tank. In the aerating trough evaporation of the water, and consequent condensation of the milk takes place. The circulation of milk through the apparatus may be continued as long as required in accordance with the judgment of the attendant, and when the milk is sufficiently condensed it may be drawn off through the cock 50. The pipe 8 may be removed for the purpose of placing a milk-can beneath the cock 50 for this purpose. When the milk is no longer supplied to the cylinder 5 in such quantity as to prevent suction of air through said cylinder to the pipe 9, the flow of milk through said pipe 9 will cease and the quantity of milk will remain in the cylinder 5. This may be drawn off through the valve 10.

We claim:—

1. A milk condenser comprising an aerator having a steam-jacketed inclined trough, a distributer for delivery of milk to the upper end of the aerator, means for the supply of heated air to the lower end of the aerator, a steam-jacketed tank to receive milk from the aerator, a steam-jacketed circulating pump adapted to receive the milk from the tank, by a conduit and to give it rotary motion and force it through a peripheral outlet at its top into a conducting pipe connecting said pump with the distributer.

2. A milk condenser comprising a tank, a steam jacket circulating pump having a peripheral outlet, and adapted to receive milk, means to deliver milk from the tank to the cylinder of said circulating pump, means to whirl milk around in the cylinder, means to convey milk from the outlet, a box to receive the milk thus conveyed, said box being provided with an outlet, a trough to receive milk from the outlet of the box, an inclined trough to receive milk from the first mentioned trough, said inclined trough being provided with steps and arranged to deliver milk to the tank.

3. A milk condenser comprising a tank; means to heat the tank; a circulating pump provided with a cylinder having a peripheral outlet; means to heat the cylinder; a conduit to supply milk from the tank to the cylinder of the circulating pump; a revoluble blade in the circulating pump; a pipe communicating with the peripheral outlet; a pump for forcing milk through the pipe; a box; said peripheral outlet communicating with the pipe below the level of the box; a trough; said box being at the upper side of the trough and having an outlet to deliver milk to such trough; an inclined trough; a cover for the same; said inclined trough being open from end to end and adapted to deliver milk to the tank, and means to force hot air through said trough.

4. In a milk condenser, an aerator in the form of an inclined covered trough open at both ends, pivoted at one end and having means for raising or depressing its other end, provided throughout its length with transverse steps having plane surfaces, with means for forcing hot air over the upper surfaces of the steps, means for supplying milk at its upper end and for conducting it from its lower end.

5. An aerator comprising an inclined stepped trough, a blower to discharge into said trough, means for supplying the blower with purified air, means for heating such air, means for supplying milk to the upper end of the trough, a pipe discharging into such means, a circulating pump opening into such pipe, means for rotating milk in the circulating pump, means for heating the circulating pump, and means for conducting milk from the aerator to said circulating pump.

6. A milk condenser comprising a circulating pump, a rotatable blade in said circulating pump, means for rotating said blade, means for heating said circulating pump, an aerator, means for forcing milk from said circulating pump through said pipe, means for distributing milk to the aerator from said pipe, and means for conducting milk from the aerator to said circulating pump.

7. In a milk condenser the means set forth for effecting a controlling continuous circulation, aeration and evaporation of milk; said means comprising a distributer and a connected inclined adjustable stepped aerator to receive milk from the distributer, in combination with a receiving and heating tank to receive milk from the aerator, a circulating pump to receive milk from the tank and to return the same to the distributer, and means for operating said circulating pump.

In testimony whereof, we have hereunto set our hands at Los Angeles California this 13th day of May 1907.

WALTER DEHETRE.
WILFRED DEHETRE.

In presence of—
JAMES R. TOWNSEND,
M. BEULAH TOWNSEND.